United States Patent [19]

Kinoshita et al.

[11] Patent Number: 5,350,994
[45] Date of Patent: Sep. 27, 1994

[54] ELECTRIC SYSTEM FOR AN ELECTRIC VEHICLE

[75] Inventors: Shigenori Kinoshita; Takao Yanase; Kouetsu Fujita; Osamu Motoyoshi; Yoshio Ito, all of Kawasaki, Japan

[73] Assignee: Fuji Electric Co., Ltd., Kanagawa, Japan

[21] Appl. No.: 70,776

[22] Filed: Jun. 3, 1993

[30] Foreign Application Priority Data

Jun. 5, 1992 [JP] Japan ................... 4-171788
Jul. 10, 1992 [JP] Japan ................... 4-207126

[51] Int. Cl.⁵ ...................................... H02J 7/10
[52] U.S. Cl. ...................................... 320/15; 320/3; 320/14
[58] Field of Search .................. 320/2, 15, 3, 14

[56] References Cited

U.S. PATENT DOCUMENTS

| | | | |
|---|---|---|---|
| 3,820,000 | 6/1974 | Smith | 320/2 |
| 4,127,803 | 11/1978 | Etienne | 320/2 |
| 5,151,641 | 9/1992 | Shamoto | 320/14 X |

FOREIGN PATENT DOCUMENTS

| | | |
|---|---|---|
| 0116925 | 8/1984 | European Pat. Off. . |
| 2353157 | 12/1977 | France . |
| 62-268301 | 11/1987 | Japan . |
| 62-268302 | 11/1987 | Japan . |
| 62-268303 | 11/1987 | Japan . |
| 2235836 | 3/1991 | United Kingdom . |

*Primary Examiner*—R. J. Hickey
*Attorney, Agent, or Firm*—Spencer, Frank & Schneider

[57] ABSTRACT

An electric system for an electric vehicle includes a main battery used for driving the vehicle, an auxiliary battery used for accessories of the vehicle, an AC motor for driving one or more wheels, an inverter for converting DC power supplied from the main battery to AC power to be supplied to the AC motor, and an auxiliary battery charging circuit for charging the auxiliary battery by using the AC power from the inverter. When charging the auxiliary battery, the AC power is insulatedly transformed and then rectified. In another example, an input capacitor in the inverter is charged by a DC-DC converter connected with the auxiliary battery as its power supply when the inverter starts. The system enables the auxiliary battery charging circuit to be small, light and low cost. The system can also charge the auxiliary battery for accessories even when the vehicle is stopping.

16 Claims, 7 Drawing Sheets

ELECTRIC SYSTEM FOR AN ELECTRIC VEHICLE

This application claims priority from patent applications in Japan Nos. 171788/1992 and 207126/1992, filed on Jun. 5, 1992 and Jul. 10, 1992, respectively, copies are enclosed and are incorporated by reference.

BACKGROUND OF THE INVENTION

1. Field of the Invention

The present invention relates to an electric system for an electric vehicle comprising a main battery for driving the vehicle and an auxiliary battery for accessories in which drive power is supplied via an inverter to an AC motor for driving wheels.

2. Description of the Related Art

FIG. 8 shows a conventional electric system for an electric vehicle having a main battery as its power supply. In this figure, reference numeral 1 power supply. In this figure, reference numeral 1 designates a main battery consisting of a series of a number of unit batteries 100; 2, a main switch; 3, fuse; 4, an inverter for driving a motor which is PWM (pulse width modulation) controlled; 5, an AC motor. In this electric vehicle, the AC motor 5 is connected to wheels of the vehicle through reduction gears and so on (not shown). Further, reference numeral 6 designates an auxiliary battery for accessories; 7, a charger. The charger 7 comprises a charging circuit for charging the auxiliary battery 6 and an initial charging circuit for charging an input capacitor in the inverter 4 which is provided to absorb higher harmonic current when the inverter 4 operates. Reference numeral 8 also denotes a switch for charging.

Reference numeral 200 denotes accessories such as lamps and a car radio and the like which use the auxiliary battery 6 as their power supply. In the case of charging the auxiliary battery 6, the charging switch 8 is closed and then the auxiliary battery charging circuit in the charger 7 operates.

In the system described above, a three-phase inverter employing transistors is used as the inverter 4 and an induction motor is widely used as the motor 5.

FIG. 9 shows an example of a circuit when a three-phase inverter is used as the inverter 4 in which reference numeral 41 denotes transistors, 42 denotes diodes, each of which is connected in antiparallel with each one of the transistors 41, and 43 denotes the input capacitor. Reference numeral 44 denotes AC output terminals connected to the motor 5, and 45 denotes DC input terminals connected to the main battery 1 through the fuse 3 and the main switch 2.

FIG. 10 shows a constitution of the charger 7 in FIG. 8. In this example, the charger 7 is constituted by a DC-DC converter. In FIG. 10, reference numeral 70 denotes the auxiliary battery charging circuit and 700, the initial charging circuit for the input capacitor 43 in the inverter 4. In this auxiliary battery charging circuit 70, reference numeral 71 denotes an input capacitor; 72, an inverter; 73, an insulating transformer; 74, a diode rectifier; 75, a smoothing circuit; 76, output terminals connected to the auxiliary battery 6; 77, input terminals connected to the main battery 1 through the switch 8 for charging. Here, the inverter 72 is constituted by a single-phase transistor inverter which is similar to the three-phase transistor inverter 4 in a main circuit.

On the other hand, in the initial charging circuit 700, reference numeral 701 denotes an input capacitor; 702, an inverter having the same constitution as that of the inverter 72; 703, an insulating transformer having a turns ratio of the primary windings to the secondary windings equal to 1; 704, a diode rectifier; and 706, output terminals connected to the input capacitor 43 in the inverter 4. The inverter 702 in the initial charging circuit 700 is operated only when the inverter 4 is started and initially charges the input capacitor 43. Further a protective fuse may be provided on the input side or on the output side of the charger 7, if necessary.

In the electric system for an electric vehicle set forth above, the voltage of the auxiliary battery 6 is normally 12 V similarly to automobiles having an internal combustion engine, while the voltage of the main battery 1 is not less than 200 V and might be over 20 times the voltage of the auxiliary battery 6. In such systems, as the input voltage (main battery voltage) applied to the charger 7 for the auxiliary battery 6 is over 20 times the output voltage (auxiliary battery voltage), electrical insulation between the input and output terminals is required for a safety purpose. Accordingly, the conventional charger 7 was forced to use the DC-DC conversion system as mentioned above which included the inverter for inverting DC input power to AC power, the rectifier for converting the AC power to DC power, and the smoothing circuit. This results in that the conventional charging system becomes not only complicated and bulky in structure, but also expensive.

Since a charger having an auxiliary battery charging circuit, an initial charging circuit for an input capacitor of an inverter and so on is mounted on a vehicle, it is required to be small in size and light in weight like a main circuit for controlling a motor. At the same time, a low cost and highly efficient charging system is desired.

SUMMARY OF THE INVENTION

It is therefore an object of the present invention to provide an electric system for an electric vehicle which can realize a small, light, low cost and highly efficient charging system by improving the constitution of an auxiliary battery charging circuit.

According to a first aspect of the present invention, there is provided an electric system for an electric vehicle comprising:

- a main battery used for driving the vehicle;
- an auxiliary battery used for accessories of the vehicle;
- an AC motor for driving one or more wheels of the vehicle;
- an inverter for converting DC power supplied from the main battery to AC power for supplying the AC motor; and
- means for charging the auxiliary battery by using the AC power from the inverter.

Here, the charging means for the auxiliary battery may comprise an insulating transformer, a rectifier and a smoothing circuit which are in turn connected to the AC output side of the inverter.

The number of phase of the insulating transformer and the rectifier may be equal to that of the inverter.

The insulating transformer and the rectifier may be of single-phase.

The inverter may be of three-phase and only two phases of three can be operated to charge the auxiliary battery.

According to a second aspect of the present invention, the electric system for an electric vehicle described above further comprises a DC-DC converter to which DC power is supplied from the auxiliary battery, the DC-DC converter initially charging an input capacitor in the inverter when the inverter starts.

According to a third aspect of the present invention, there is provided an electric system for an electric vehicle comprising:

a main battery used for driving the vehicle;

an auxiliary battery used for accessories of the vehicle;

an AC motor for driving one or more wheels of the vehicle;

an inverter for converting DC power supplied from the main battery to AC power for supplying the AC motor; and means for charging the auxiliary battery by using a phase voltage of the AC power from the inverter.

Here, the charging means for the auxiliary battery may comprise:

an insulating transformer in which the primary side are connected with a terminal of the AC power side of the inverter and the middle terminal of the main battery;

a rectifier connected with the secondary side of the transformer; and a smoothing circuit connected with the rectifier.

Only one phase of the inverter whose terminal is connected with the charging means may be operated to charge the auxiliary battery in the state that the AC motor does not operate.

The main battery and the auxiliary battery may have the same kind of unit battery, and the turns ratio (the number of the primary winding turns/the number of the secondary winding turns) of the insulating transformer is n/2 in the case that the voltage of the main battery is n times the voltage of the auxiliary battery.

According to the first and second aspects of the present invention, the auxiliary battery is charged by using AC output voltage of the inverter, by giving attention to the fact that a waveform of the AC output voltage of the inverter for driving the AC motor is a train of pulses, like teeth of a comb, having peak values corresponding to the voltage value of the main battery irrespective of an amount of a RMS (root mean square) value of a fundamental wave, i.e., voltage of the AC motor.

Here, FIGS. 11 and 12 show AC output voltage waveforms of the inverter. FIG. 11 shows the case that a RMS value of a fundamental wave of the AC output voltage of the inverter is approximately zero. FIG. 12 shows the case that a RMS value of a fundamental wave of the AC output voltage of the inverter is approximately maximum. It is understood from these figures that the AC output voltage of the inverter is a train of pulses whose peak values are always equal to the voltage $V_B$ of the main battery. In addition, the AC output voltage of the inverter only varies the width of the pulses in response to a RMS value of its fundamental wave.

A pulse repetition rate of the train of pulses set forth above corresponds to a PWM (pulse width modulation) carrier frequency of the inverter, and also an alternating frequency of the train of pulses corresponds to a fundamental frequency of the inverter, i.e., a frequency of the AC motor.

According to the first aspect of the invention, DC power is obtained by connecting the auxiliary battery charging circuit, which may include an insulating and step-down transformer, a rectifier and so on, to the AC output side of the inverter. This DC power thus charges the auxiliary battery.

Moreover, the second aspect of the invention further comprises the initial charging circuit having a DC-DC converter to which DC power is supplied from the auxiliary battery. The initial charging circuit initially charges the input capacitor in the inverter when the inverter starts.

According to the third aspect of the invention, the auxiliary battery is charged by using AC output phase voltage of the inverter, by giving the attention to the fact that a waveform of the AC output phase voltage of the inverter, in other words, a waveform of the voltage between a one terminal of the AC output side of the inverter and the middle terminal of the main battery is a train of pulses, like teeth of a comb, having peak values corresponding to ½ the voltage value of the main battery irrespective of an amount of a RMS value of a fundamental wave, i.e., voltage of the AC motor.

Here, FIGS. 13 and 14, which correspond to FIGS. 11 and 12, respectively, show AC output phase voltage waveforms of the inverter. FIG. 13 shows the case that a RMS value of a fundamental wave of the AC output voltage of the inverter is approximately zero. FIG. 14 shows the case that a RMS value of a fundamental wave of the AC output voltage of the inverter is approximately maximum. It is understood from these figures that the AC output phase voltage of the inverter is a train of pulses whose peak values are always equal to half the voltage $V_B$ of the main battery. In addition, the AC output phase voltage of the inverter only varies the width of the pulses in response to a RMS value of its fundamental wave.

A pulse repetition rate of the train of pulses set forth above corresponds to a PWM carrier frequency of the inverter, and also an alternating frequency of the train of pulses corresponds to a fundamental frequency of the inverter, i.e., a frequency of the AC motor, as previously mentioned.

According to the third aspect of the present invention, the primary side of the insulating transformer in the auxiliary battery charging circuit are connected with the one terminal of the inverter at its AC output side and the middle terminal of the main battery, while the secondary side of the insulating transformer are connected with the auxiliary battery via the rectifier and the smoothing circuit, so that the auxiliary battery is charged by using the AC output phase voltage of the inverter.

According to the first and second aspects of the invention, pulse-like voltage, which has peak values corresponding to the voltage value of the main battery, is generated at the AC output side of the inverter for driving the motor irrespective of load conditions of the inverter. This pulse-like voltage is dropped down to the voltage of the auxiliary battery by the step-down transformer and rectified by the rectifier, and then used to charge the auxiliary battery. Therefore, the auxiliary battery is always charged during operation of the inverter.

Further, minimum charging voltage for the auxiliary battery is 1/n the voltage of the main battery when the depth of discharge is 100%, and maximum charging voltage for the auxiliary battery is 1/n the voltage of the main battery when the depth of discharge is 0%, where n is voltage ratio of the step-down transformer. In the event that the type of the auxiliary battery is the same as that of an unit battery of the main battery, voltage ratio of the step-down transformer can be selected to be equal to the number of unit batteries, resulting in that voltage value of the auxiliary battery is always maintained between voltage values of the unit battery when the depth of discharge is 100% and 0%, respectively.

In the second aspect of the invention, the DC-DC converter which charges the input capacitor in the inverter by using the auxiliary battery as its power supply is operated only when the inverter starts or restarts. After the capacitor is charged up to a predetermined voltage level, the operation of the DC-DC converter is stopped.

According to the third aspect of the invention, pulse-like voltage, which has peak values corresponding to half the voltage value of the main battery, is generated between the one terminal of the inverter at its AC output side and the middle terminal of the main battery irrespective of load conditions of the inverter. This pulse-like voltage is dropped down to the voltage of the auxiliary battery by the step-down transformer and rectified by the rectifier, and then used to charge the auxiliary battery. Therefore, the auxiliary battery is always charged during operation of the inverter.

In addition, even when the inverter is under non-operating conditions, it is possible to charge the auxiliary battery by operating only one phase of the inverter to which the charging circuit is connected. In other words, it is possible to charge the auxiliary battery when the motor does not rotate and the vehicle stops.

According to the present invention, since the auxiliary battery charging circuit can be constituted by only the insulating transformer, the rectifier and the smoothing circuit, the number of components can be reduced in comparison with the conventional circuit. In addition, since the auxiliary battery charging circuit does not have a DC-DC converter, it is not necessary to control semi-conductor switching elements. Due to the fact mentioned immediately above, a small, light and low cost auxiliary battery charging circuit can be realized. This makes the auxiliary battery charging circuit highly practicable as equipment mounted on an electric vehicle.

In a conventional automobile having an internal combustion engine, a battery is always charged by a generator during operation of the engine. According to the present invention, since the auxiliary battery is likewise always charged during operation of the electric vehicle, that is, during operation of the inverter, drivers do not have a feeling of disorder.

Moreover, according to the first and second aspects of the invention, in the case that an inverter is of three-phase, it is possible to charge the auxiliary battery by operating only two phases thereof without rotating the motor, i.e., without moving the vehicle.

Further, according to the third aspect of the invention, it is possible to charge the auxiliary battery by operating only one phase of the three-phase inverter.

As discussed above, since it is essential for the auxiliary battery charging circuit of the electric vehicle to enable to charge the auxiliary battery without rotating the motor, i.e., without traveling the vehicle, the electric system according to the invention is highly practicable. This also can contribute to ensure the safety of the system in which, for example, the main battery and the auxiliary battery are charged while the vehicle is stopping.

In particular, according to the second aspect of the invention, since the input capacitor in the inverter is charged by the DC-DC converter connected with the auxiliary battery as its power supply, there are provided the following advantages. Namely, it is possible to use semi-conductor switching elements for low voltage because the inverter in the DC-DC converter (initial charging circuit) is rated at the voltage level of the auxiliary battery. Further, since there are provided the step-up transformer and the diode rectifier only on the AC output side of this inverter, it is possible to make the initial charging circuit small and light. As a result, the initial circuit like the auxiliary battery charging circuit has a significant practical advantage as equipment mounted on an electric vehicle.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

Figure 1:
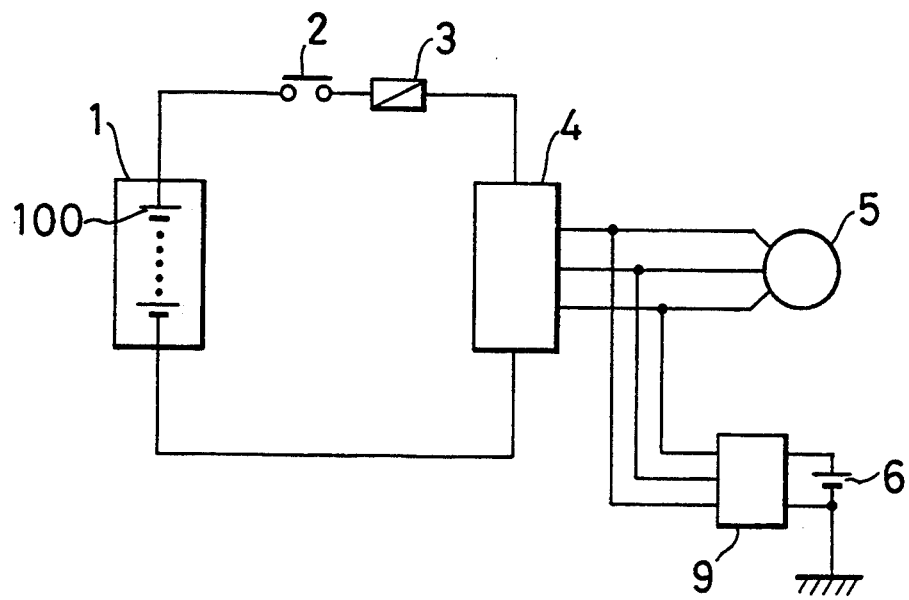
FIG. 1 is a block diagram of a first embodiment of the present invention.
Figure 8:
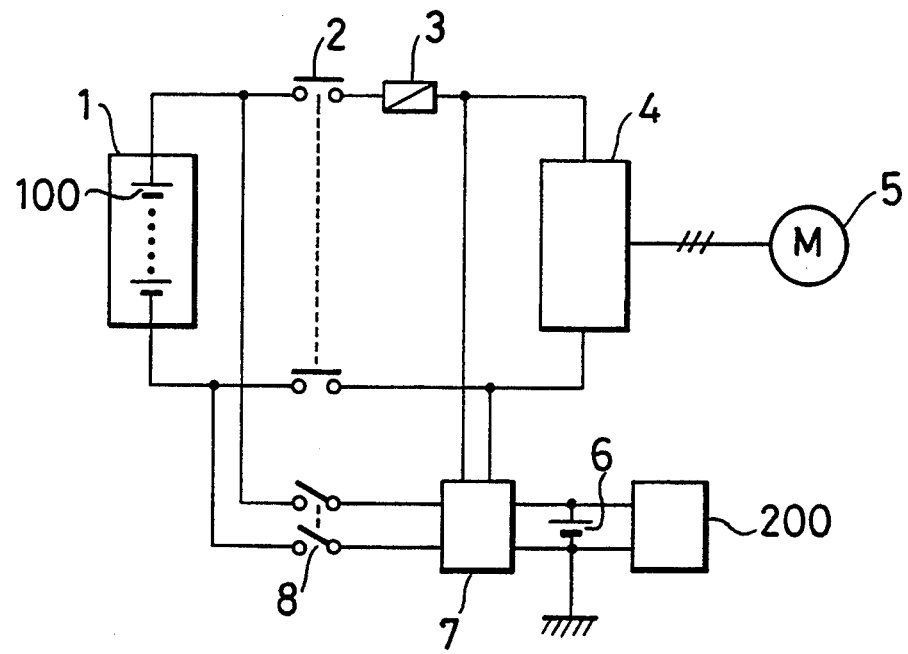
FIG. 8 is a block diagram showing a conventional charging system.
Figure 9:
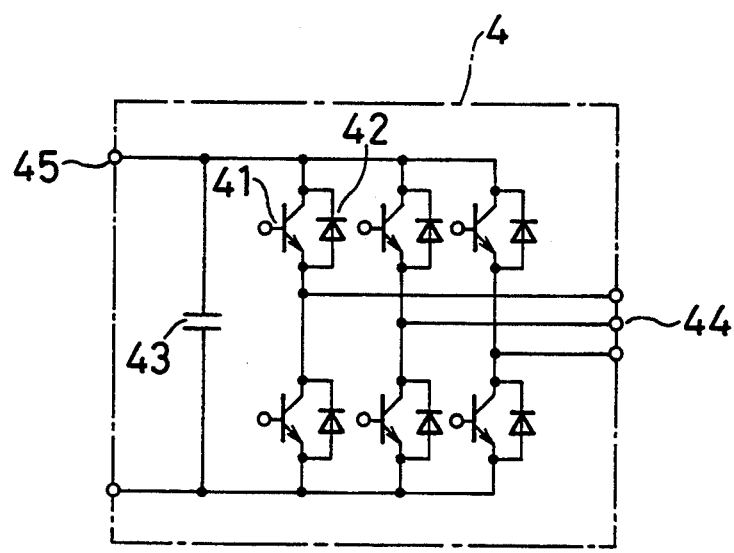
FIG. 9 is a circuit diagram showing the arrangement of an inverter commonly used for the conventional system and for the embodiments of the present invention.
Figure 10:
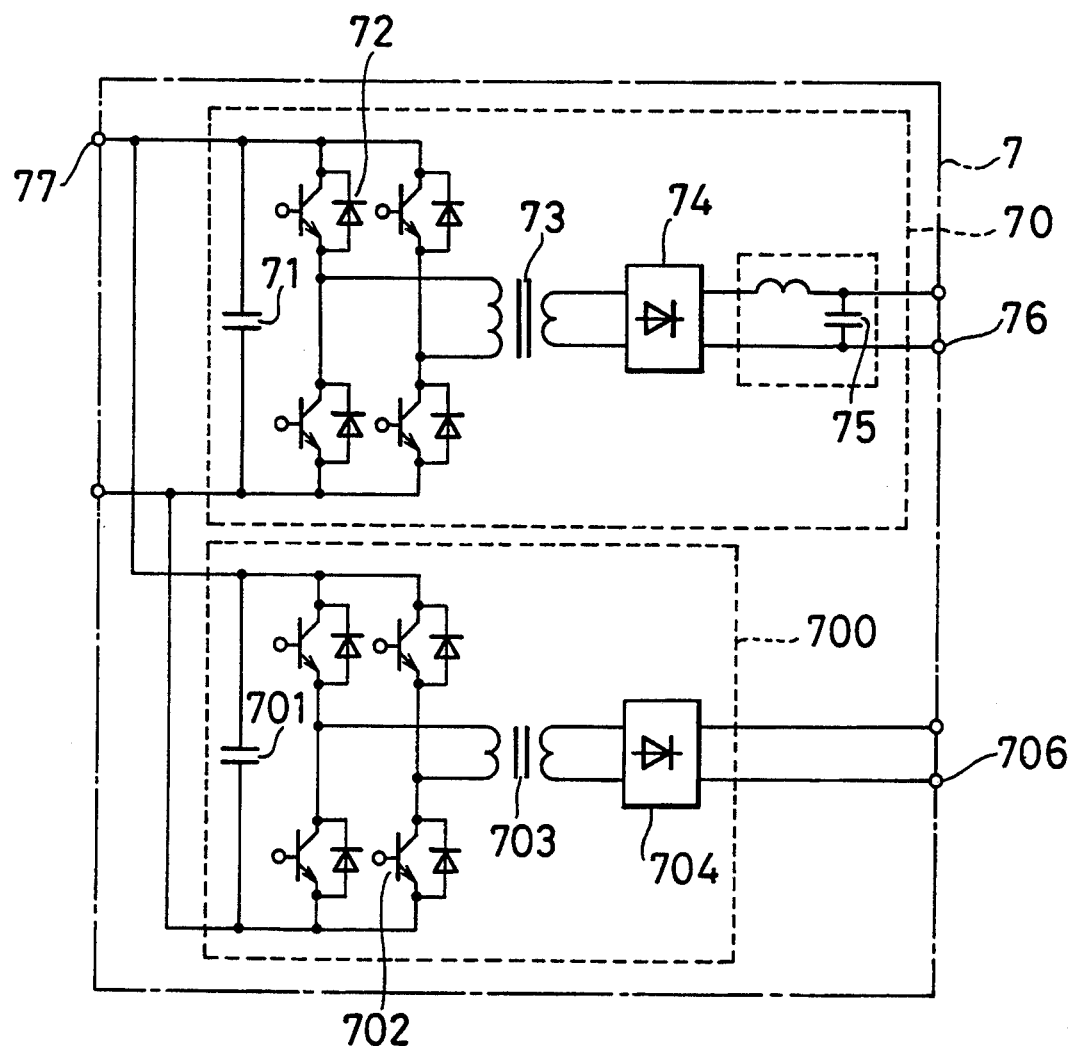
FIG. 10 is a circuit diagram showing a charger in FIG. 8.
Figure 11:
FIG. 11 illustrates a waveform of an output voltage of the inverter of FIG. 8.
Figure 12:
FIG. 12 illustrates a waveform of an output voltage of the inverter of FIG. 8.

FIG. 1 shows an arrangement of a first embodiment of the present invention. In this figure, the same reference numerals designate the same or corresponding elements in FIG. 8. In FIG. 1, an auxiliary battery charging circuit 9 is connected with the AC output side of an inverter 4 and an auxiliary battery 6, respectively. Here, accessories such as lamps and a car radio which use the auxiliary battery 6 as its power supply are not shown for the clarity.

Figure 2:
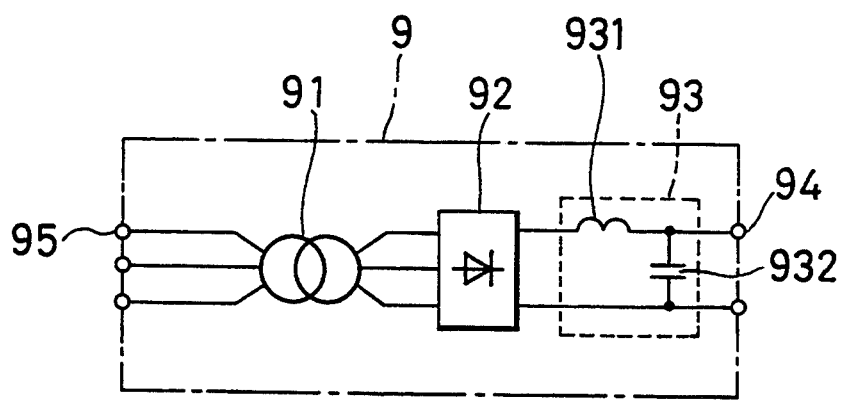
FIG. 2 is a circuit diagram showing an auxiliary battery charging circuit in FIG. 1.

FIG. 2 shows an internal constitution of the auxiliary battery charging circuit 9. In this figure, reference numeral 95 denotes input terminals connected to the AC output side of the inverter 4; 91, an insulating step-down transformer which primary side is connected to the input terminals 95. In this embodiment, since the inverter 4 is of three-phase the step-down transformer 91 and a rectifier 92 described below are also of three-phase.

The rectifier 92 which is connected to the secondary side of the step-down transformer 91 may be a diode rectifier in general. A smoothing circuit 93 connected to the DC output side of the rectifier 92 consists of an inductor 931 and a capacitor 932 for smoothing a charging current of the auxiliary battery 6. Output terminals 94 are connected to the auxiliary battery 6. On the input side or output side of the auxiliary battery charging circuit 9, a protective fuse (not shown) is inserted as needed.

Figure 3:
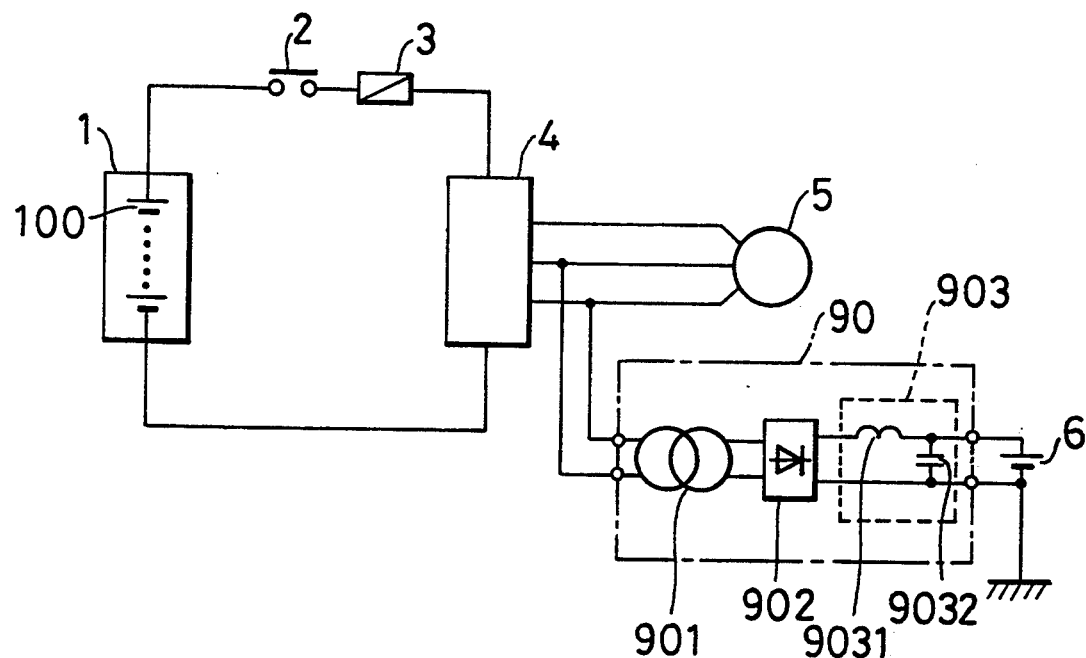
FIG. 3 is a block diagram of a second embodiment of the present invention.

FIG. 3 shows the arrangement of a second embodiment of the present invention. In this figure, the same reference numerals designate the same or corresponding elements in FIGS. 1 and 2.

The first embodiment shown in FIGS. 1 and 2 charges the auxiliary battery 6 by utilizing three-phase output of the inverter 4. On the other hand, the second embodiment charges the auxiliary battery 6 by utilizing single-phase output. Namely, reference numeral 90 designates an auxiliary battery charging circuit of single-phase in which reference numeral 901 denotes a single-phase and insulating step-down transformer; 902, a single-phase rectifier; and 903, a smoothing circuit consisting of an inductor 9031 and a capacitor 9032. According to the second embodiment, since the auxiliary battery charging circuit 90 can be constructed with single-phase specifications in contrast to the first embodiment, the step-down transformer 901, the rectifier 902 and so on can be simplified. As a result, a small, light weight and low cost charging circuit 90 can be realized.

Moreover, as a method for driving the auxiliary battery charging circuit 90, it is preferable to supply the AC output of single-phase to the charging circuit 90 in such a manner that the inverter 4 is operated with only two phases, not with all three phases. As a result, it is possible to charge the auxiliary battery 6 without rotating the AC motor 5, that is, without moving the electric vehicle.

Figure 4:
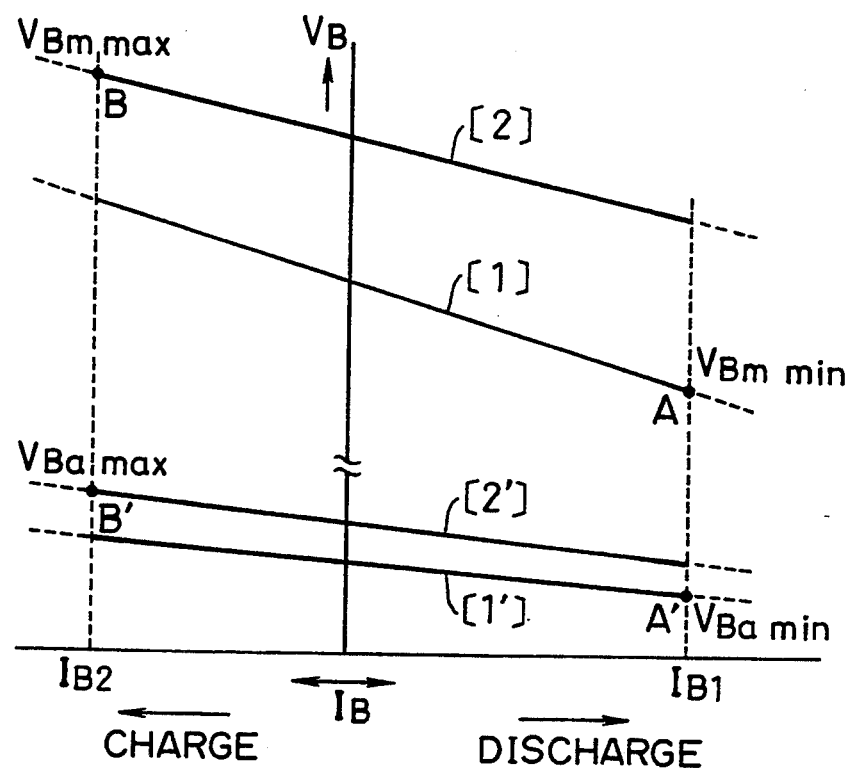
FIG. 4 is a graph showing relationship between currents and voltages when a main battery and an auxiliary battery are charged and discharged, respectively.

Here, in the case that the voltage of the unit battery 100 of the main battery 1 is equal to that of the auxiliary battery 6 in the first and second embodiments, turn ratio (voltage ratio) "a" of the primary winding turns to the secondary winding turns in the step-down transformer 91, 901 may be selected as follows:

$$a = n_1/n_2 = m \quad (1)$$

where
$n_1$ = the number of primary winding turns
$n_2$ = the number of secondary winding turns
$m$ = the number of unit batteries 100 in series The relationship between the main battery voltage and the auxiliary battery voltage in this case is shown in FIG. 4. In this figure, lines [1] and [2] show the relationship between charge-discharge current $I_B$ of the main battery 1 and battery voltage $V_B$ when the depth of discharge is 100%, and 0%, respectively. Point "A" on line [1] represents minimum voltage $V_{Bm\ min}$ (discharge current $I_{B1}$) and point "B" on line [2] represents maximum voltage $V_{Bm\ max}$ (charge current $I_{B2}$).

On the other hand, lines [1'] and [2'] show the relationship between charge-discharge current $I_B$ of the auxiliary battery 6 and battery voltage $V_B$ when the depth of discharge is 100%, and 0%, respectively. Since the auxiliary battery 6 is identical with the unit battery 100, charge-discharge current values are nearly equal to those of the main battery 1. Point "A'" on line [1'] represents minimum voltage $V_{Ba\ min}$ (discharge current $I_{B1}$) and point "B'" on line [2'] represents maximum voltage $V_{Ba\ max}$ (charge current $I_{B2}$).

Here, since the voltage ratio of the step-down transformer 91, 901 is selected as defined in equation (1) set forth above, the minimum voltage $V_{Ba\ min}$ and the maximum voltage $V_{Ba\ max}$ of the auxiliary battery 6 are, respectively, as follows:

$$V_{Ba\ min} = V_{Bm\ min}/m \quad (2)$$

$$V_{Ba\ max} = V_{Bm\ max}/m \quad (3)$$

As described above, in these embodiments regulation in the voltage of the auxiliary battery 6 is equal to that of the main battery 1.

In the case that the voltages of the auxiliary battery 6 and the main battery 1 do not have the relation mentioned above or that kinds of the batteries are different from each other, it is necessary to select the turn ratio of the step-down transformer 91, 901 to be corresponding to the voltage ratio of the batteries.

Figure 5:
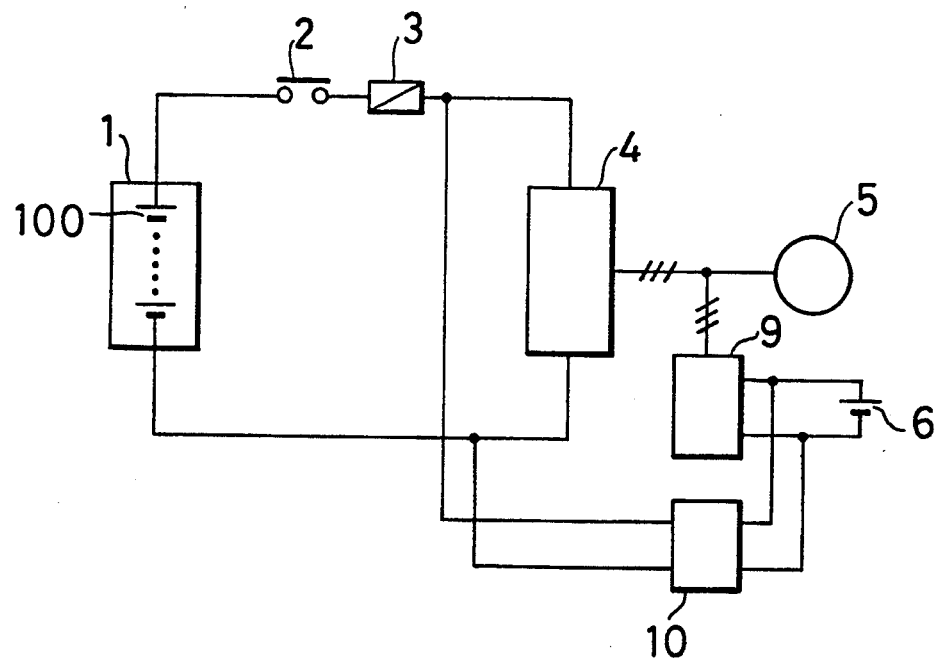
FIG. 5 is a block diagram of a third embodiment of the present invention.

FIG. 5 shows an embodiment with respect to the second aspect of the invention. This embodiment further comprises an initial charging circuit 10 for charging the input capacitor 43 in the inverter 4 in addition to the embodiment in FIG. 1. The same reference numerals designate the same or corresponding elements in FIG. 1. The initial charging circuit 10, which substantially consists of a DC-to-DC converter, charges the input capacitor 43 by utilizing the auxiliary battery 6 as its power supply.

Figure 6:
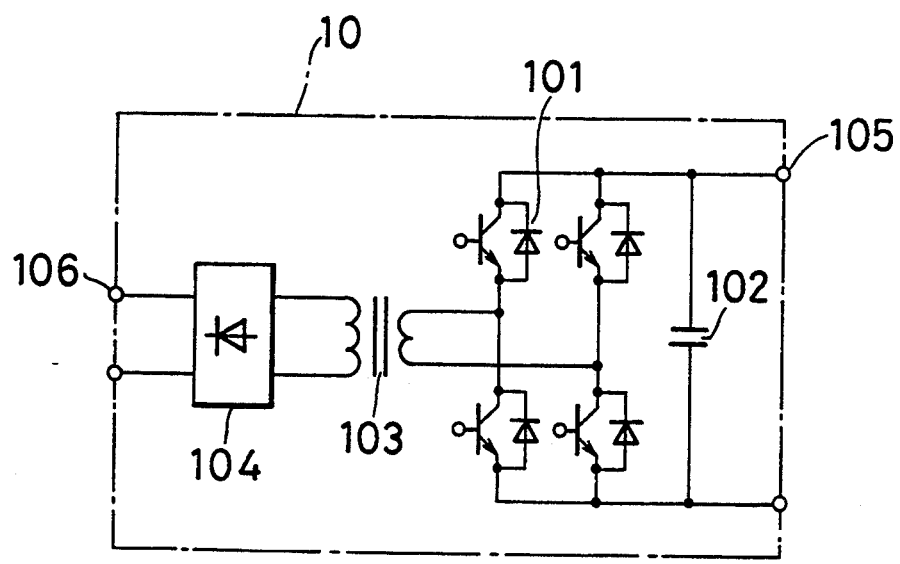
FIG. 6 is a circuit diagram showing an initial charging circuit in FIG. 5.

FIG. 6 shows the arrangement of the initial charging circuit 10 described above. In this figure, reference numeral 105 denotes input terminals connected to the auxiliary battery 6; 102, an input capacitor for smoothing; 101, an inverter; 103, an insulating step-up transformer; 104, a rectifier; 106, output terminals connected to the input capacitor 43 in the inverter 4. Although the inverter 101 shown in FIG. 6 is of single-phase inverter, it may be of three-phase. In this embodiment, the inverter 101 operates only when the input capacitor 43 is charged in starting the inverter 4. A switch or a protective fuse (not shown) can be inserted on the input side or the output side of the initial charging circuit 10 as required.

Moreover, although the charging circuit 9 for the auxiliary battery 6 in the embodiment shown in FIG. 5 is of three-phase, it may be of single-phase as in the case of the embodiment shown in FIG. 3.

Figure 7:
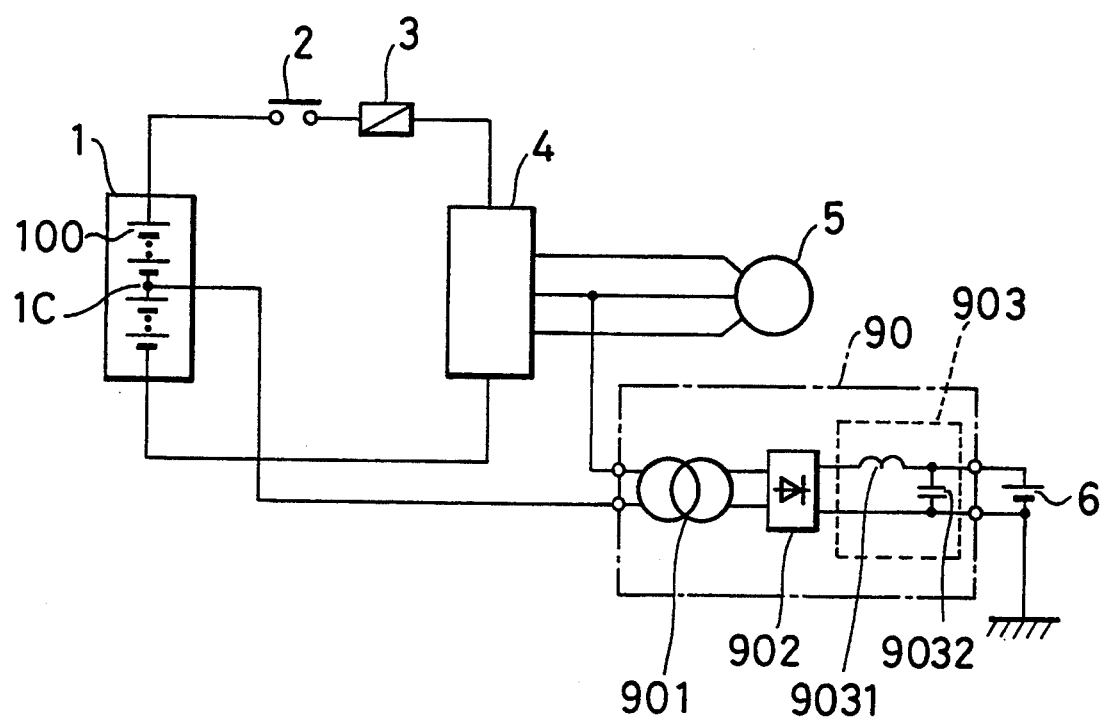
FIG. 7 is a block diagram of a fourth embodiment of the present invention.

FIG. 7 shows an embodiment according to a third aspect of the invention in which the primary side of the insulating step-down transformer 901 in the auxiliary battery charging circuit 90 shown in FIG. 3 are connected to a one terminal of the inverter 4 at the AC output side thereof and the middle terminal 1C of the main battery 1 at which voltage is half the voltage of the main battery 1. A switch or a protective fuse (not shown) can be inserted on the input side or the output side of the auxiliary battery charging circuit 90 as required.

Figure 13:
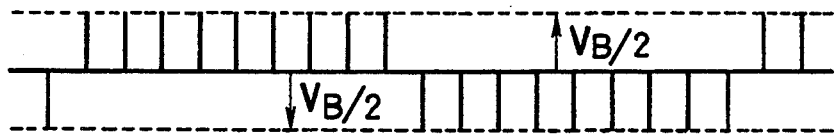
FIG. 13 illustrates a waveform of an output phase voltage of the inverter of FIG. 7.
Figure 14:
FIG. 14 illustrates a waveform of an output phase voltage of the inverter of FIG. 7.

In this embodiment, the phase voltage of the inverter 4 at the AC output side thereof is a train of pulses having a peak value which is ½ voltage value of the main battery 1 independently of operating conditions of the inverter 4 as shown in FIGS. 13 and 14, so that the auxiliary battery 6 is charged by utilizing the phase voltage. Here, in the case that the unit battery 100 of the main battery 1 and the auxiliary battery 6 are the same type and have the same voltage, turn ratio (voltage ratio) "a" of the primary winding turns to the secondary winding turns in the step-down transformer 91,901 may be selected according to the following equation (4):

$$a = n_1/n_2 = m/2 \tag{4}$$

where $n_1$ = the number of primary winding turns
$n_2$ = the number of secondary winding turns
$m$ = the number of unit batteries 100 in series Here, the relationships in voltage and current between the main battery 1 and the auxiliary battery 6 are the same as those shown in FIG. 4, and the details are omitted to avoid redundancy.

In this embodiment, even when a vehicle stops under non-operating conditions of the motor 5, it is possible to charge the auxiliary battery 6 by operating only the one-phase of the inverter 4 to which is connected the charging circuit 90.

Although specific embodiments of an electric system for an electric vehicle constructed in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. An electric system for an electric vehicle comprising:
 a main battery used for driving the vehicle, said main battery having a plurality of unit batteries and providing a first voltage;
 an auxiliary battery used for accessories of the vehicle, said auxiliary battery having the same kind of unit battery as said main battery and providing a second voltage, said first voltage being n times said voltage;
 an AC motor for driving one or more wheels of the vehicle;
 an inverter for converting DC power supplied from said main battery to AC power for supply to said AC motor; and
 charging means for charging said auxiliary battery by using the AC power from said inverter, said charging means for the auxiliary battery comprising a step-down insulating transformer for reducing the output voltage of said inverter to the charging voltage of said auxiliary battery, a rectifier and a smoothing circuit which are in turn connected to an AC output side of said inverter,
 wherein a turns ratio of said step-down insulating transformer is n.

2. An electric system for an electric vehicle as claimed in claim 1, wherein a number of phases of said insulating transformer and said rectifier is equal to that of said inverter.

3. An electric system for an electric vehicle as claimed in claim 1, wherein said insulating transformer and said rectifier are of single-phase.

4. An electric system for an electric vehicle as claimed in claim 3, wherein said inverter is of three-phase and only two phases of three are operated to charge said auxiliary battery.

5. An electric system for an electric vehicle as claimed in claim 1, further comprising a DC-DC converter to which DC power is supplied from said auxiliary battery and an input capacitor in said inverter, said DC-DC converter initially charging said input capacitor in said inverter when said inverter starts.

6. An electric system for an electric vehicle as claimed in claim 5, wherein a number of phases of said insulating transformer and said rectifier is equal to that of said inverter.

7. An electric system for an electric vehicle as claimed in claim 6, wherein said insulating transformer and said rectifier are of single-phase.

8. An electric system for an electric vehicle as claimed in claim 6, wherein said inverter is of three-phase and only two phases of the three are operated to charge said auxiliary battery.

9. An electric system for an electric vehicle comprising:
 a main battery used for driving the vehicle;
 an auxiliary battery used for accessories of the vehicle;
 an AC motor for driving one or more wheels of the vehicle;
 an inverter for converting DC power supplied from said main battery to AC power for supply to said AC motor; and
 charging means for charging said auxiliary battery by using a phase voltage of the AC power from said inverter, the charging means comprising,
 an insulating transformer having a primary side connected to a terminal of the AC power side of said inverter and a middle terminal of said main battery;
 a rectifier connected with the secondary side of said transformer; and
 a smoothing circuit connected with said rectifier.

10. An electric system for an electric vehicle as claimed in claim 9, wherein one phase of said inverter having a terminal connected with said charging means is operated to charge said auxiliary battery when said AC motor does not operate.

11. An electric system for an electric vehicle as claimed in claim 9, wherein said main battery and said auxiliary battery have the same kind of unit battery, and a turns ratio of said insulating transformer is n/2 when the voltage of said main battery is n times the voltage of said auxiliary battery.

12. An electric system for an electric vehicle as claimed in claim 10, wherein said main battery and said auxiliary battery have the same kind of unit battery, and a turns ratio of said insulating transformer is n/2 when the voltage of said main battery is n times the voltage of said auxiliary battery.

13. An electric system for an electric vehicle, comprising:
 a main battery used for driving the vehicle;
 an auxiliary battery used for accessories of the vehicle;
 an AC motor for driving one or more wheels of the vehicle;
 an inverter for converting DC power supplied from said main battery to AC power for supply to the AC motor, the inverter having an input capacitor;

charging means for charging the auxiliary battery by using the AC power from the inverter; and a DC-DC converter to which DC power is supplied from the auxiliary battery, said DC-DC converter initially charging the input capacitor in the inverter when the inverter starts.

14. An electric system for an electric vehicle according to claim 13, wherein a number of phases of the insulating transformer and the rectifier is equal to that of the inverter.

15. An electric system for an electric vehicle according to claim 14, wherein the insulating transformer and the rectifier are of single phase.

16. An electric system for an electric vehicle according to claim 14, wherein the inverter is of three-phase and only two phases of three are operated to charge the auxiliary battery.

* * * * *